United States Patent
Lin et al.

(10) Patent No.: US 11,575,232 B2
(45) Date of Patent: Feb. 7, 2023

(54) ELECTRICAL PLUG

(71) Applicant: Delta Electronics, Inc., Taoyuan (TW)

(72) Inventors: Yu-Wei Lin, Taoyuan (TW); Shao-Hua Li, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 28 days.

(21) Appl. No.: 17/470,837

(22) Filed: Sep. 9, 2021

(65) Prior Publication Data
US 2022/0360026 A1 Nov. 10, 2022

(30) Foreign Application Priority Data
May 7, 2021 (CN) .......................... 202110499805.5

(51) Int. Cl.
| | | |
|---|---|---|
| H01R 13/66 | (2006.01) | |
| H01R 24/28 | (2011.01) | |
| H01R 13/502 | (2006.01) | |
| H01R 24/68 | (2011.01) | |

(52) U.S. Cl.
CPC ....... *H01R 13/6683* (2013.01); *H01R 13/502* (2013.01); *H01R 24/28* (2013.01); *H01R 24/68* (2013.01)

(58) Field of Classification Search
CPC .......... H01R 13/66–696; H01R 13/502; H01R 13/7137; H01R 24/28; H01R 24/68
USPC ........................................ 439/620.01–620.34
See application file for complete search history.

(56) References Cited

U.S. PATENT DOCUMENTS

| | | | | |
|---|---|---|---|---|
| 4,089,032 A | * | 5/1978 | Dell Orfano | ............ H01C 7/12 361/111 |
| 4,968,264 A | * | 11/1990 | Ruehl | .................. H01H 85/547 337/229 |
| 5,072,334 A | * | 12/1991 | Burgess | .............. B60R 16/0239 361/828 |

(Continued)

FOREIGN PATENT DOCUMENTS

| | | |
|---|---|---|
| CN | 103682854 B | 1/2016 |
| CN | 106208183 A | 12/2016 |

(Continued)

*Primary Examiner* — Gary F Paumen
(74) *Attorney, Agent, or Firm* — Kirton McConkie; Evan R. Witt

(57) ABSTRACT

The present disclosure provides an electrical plug including a first temperature detection element and a second temperature detection element. When the processor determines that the temperature of the contact pins is greater than or equal to a temperature threshold according to a first detection signal outputted by the first temperature detection element and a second detection signal outputted by the second temperature detection element, the processor disables the electrical plug to transmit the input power to a load. When one of the temperature detection elements fails, the electrical plug determines whether the temperature of the electrical plug is greater than or equal to the temperature threshold according to the other one of the temperature detection elements. The electrical plug meets the redundant design required for functional safety to avoid unexpected hazards caused by the failure of a single temperature detection element. Therefore, the stability of the electrical plug is enhanced.

7 Claims, 8 Drawing Sheets

(56) References Cited

U.S. PATENT DOCUMENTS

| | | | | |
|---|---|---|---|---|
| 5,590,010 | A | * | 12/1996 | Ceola .................. H01R 13/7137 337/13 |
| 5,777,868 | A | * | 7/1998 | Gibboney, Jr. .......... H02H 9/04 363/126 |
| 9,564,719 | B1 | | 2/2017 | Oldham et al. |
| 2003/0001715 | A1 | * | 1/2003 | Montague .......... H01R 13/4534 337/198 |
| 2006/0270250 | A1 | * | 11/2006 | Allen ...................... F21S 4/26 439/43 |
| 2008/0096429 | A1 | * | 4/2008 | Mikolajczak ...... H01R 13/6666 439/620.08 |
| 2009/0243581 | A1 | * | 10/2009 | Taylor ................. H01R 25/006 323/305 |
| 2010/0193503 | A1 | * | 8/2010 | Kim ........................ H05B 3/56 219/494 |
| 2011/0104940 | A1 | * | 5/2011 | Rabu ................... H01R 31/065 439/502 |
| 2012/0094509 | A1 | * | 4/2012 | Bryan ................. B60Q 11/005 439/76.1 |
| 2013/0141244 | A1 | * | 6/2013 | Chien .................... G01R 31/52 340/644 |
| 2015/0001937 | A1 | * | 1/2015 | Wang .................... H02J 7/0045 307/52 |
| 2015/0171567 | A1 | | 6/2015 | Kawamoto et al. |
| 2017/0237205 | A1 | | 8/2017 | Fuehrer et al. |
| 2018/0233936 | A1 | | 8/2018 | Yamada et al. |
| 2022/0294165 | A1 | * | 9/2022 | Lin ...................... H01R 13/502 |

FOREIGN PATENT DOCUMENTS

| | | |
|---|---|---|
| CN | 206283054 U | 6/2017 |
| CN | 109367413 A | 2/2019 |
| CN | 209365943 U | 9/2019 |
| CN | 106573542 B | 2/2020 |
| CN | 107454877 B | 5/2020 |
| CN | 111527577 A | 8/2020 |
| CN | 212062756 U | 12/2020 |
| DE | 202017106035 U1 | 1/2019 |
| TW | M482869 U | 7/2014 |
| TW | I600244 B | 9/2017 |

* cited by examiner

ELECTRICAL PLUG

CROSS-REFERENCE TO RELATED APPLICATION

This application claims priority to China Patent Application No. 202110499805.5 filed on May 7, 2021. The entirety of the above-mentioned patent application is incorporated herein by reference for all purposes.

FIELD OF THE INVENTION

The present disclosure relates to an electrical plug, and more particularly to an electrical plug having enhanced stability.

BACKGROUND OF THE INVENTION

With the rising of environmental protection, the development of electric vehicle has become a popular trend. Generally, an electrical plug applied to a charger for the electric vehicle is served as an interface connected between a power source and the electric vehicle. The stability of the electrical plug is important. Especially, temperature is an important factor to control the stability of the electrical plug.

Conventional electrical plug applied to the charger for the electric vehicle includes a single temperature detection element which is served as the basis for determining the over-temperature protection of the electrical plug. However, the over-temperature protection mechanism with only single temperature detection element does not meet the element failure requirements of functional safety. In case that the single temperature detection element fails or misjudgment occurs, the electrical plug cannot determine whether the electrical plug is in an over-temperature state to interrupt the transmission of electric energy. Consequently, during the process of charging the electric vehicle, the temperature of the electric vehicle may be subjected to over-temperature and cause danger.

Therefore, there is a need of providing an improved electrical plug in order to address the drawbacks of the conventional technology.

SUMMARY OF THE INVENTION

An object of the present disclosure provides an electrical plug having enhanced stability.

In accordance with an aspect of the present disclosure, an electrical plug is provided. The electrical plug is detachably coupled to a socket of a load. The electrical plug includes a casing, a plurality of contact pins, a power cable, a circuit board, a first temperature detection element, a verification resistor, a second temperature detection element and a processor. The plurality of contact pins are disposed on the casing and configured to plug into the socket so as to provide an input power required by the socket. The power cable is connected with the plurality of contact pins and configured to transmit the input power to the load through the socket when the electrical plug is coupled to the socket and the electrical plug is in a normal state. The circuit board is disposed in the casing. The first temperature detection element is disposed on the circuit board and adjacent to the plurality of contact pins. The first temperature detection element is configured to detect a temperature of the plurality of contact pins and output a first detection signal. A temperature variation of the plurality of contact pins is correlated with an impedance variation of the first temperature detection element, and the first detection signal reflects the impedance variation of the first temperature detection element. The verification resistor is disposed on the circuit board and has an impedance value according to a type of the electrical plug. The second temperature detection element is disposed on the circuit board, adjacent to the plurality of contact pins and electrically connected with the verification resistor. The second temperature detection element is configured to detect the temperature of the plurality of contact pins and output a second detection signal. The temperature variation of the plurality of contact pins is correlated with a current variation of the second temperature detection element. The processor is electrically connected with the first temperature detection element and the second temperature detection element. The processor is configured to determine whether the temperature of the plurality of contact pins is greater than or equal to a temperature threshold according to the first detection signal and the second detection signal, and the processor disables the electrical plug to transmit the input power to the load when the electrical plug is in an over-temperature state.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
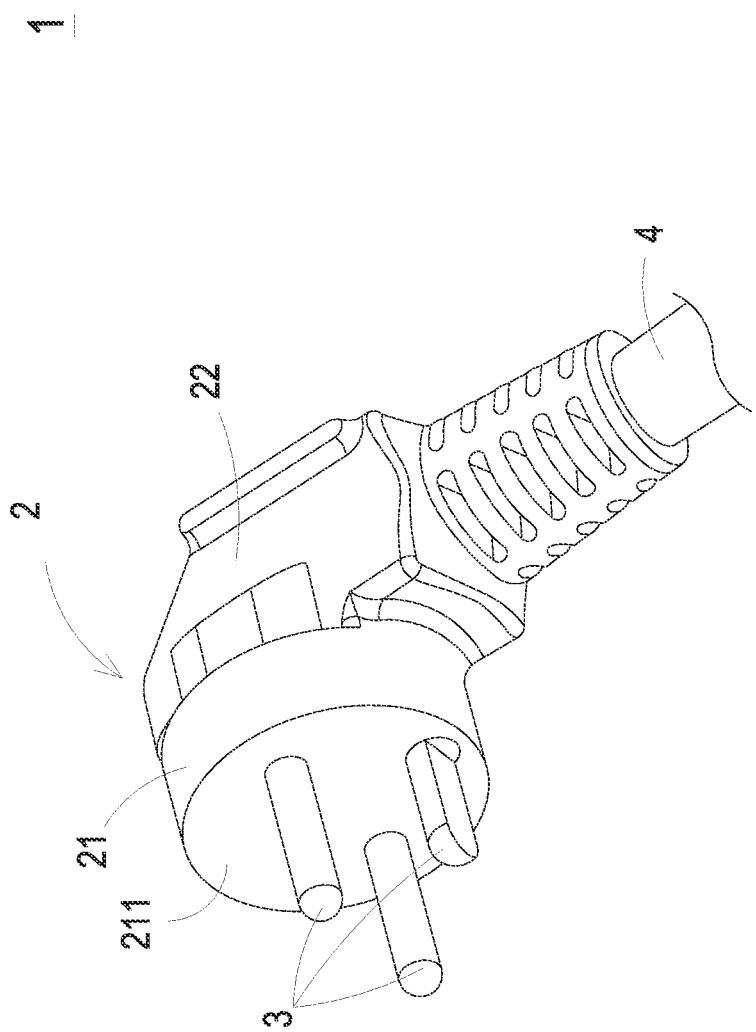
FIG. 1 is a schematic perspective view illustrating the structure of an electrical plug according to a first embodiment of the present disclosure.
Figure 2:
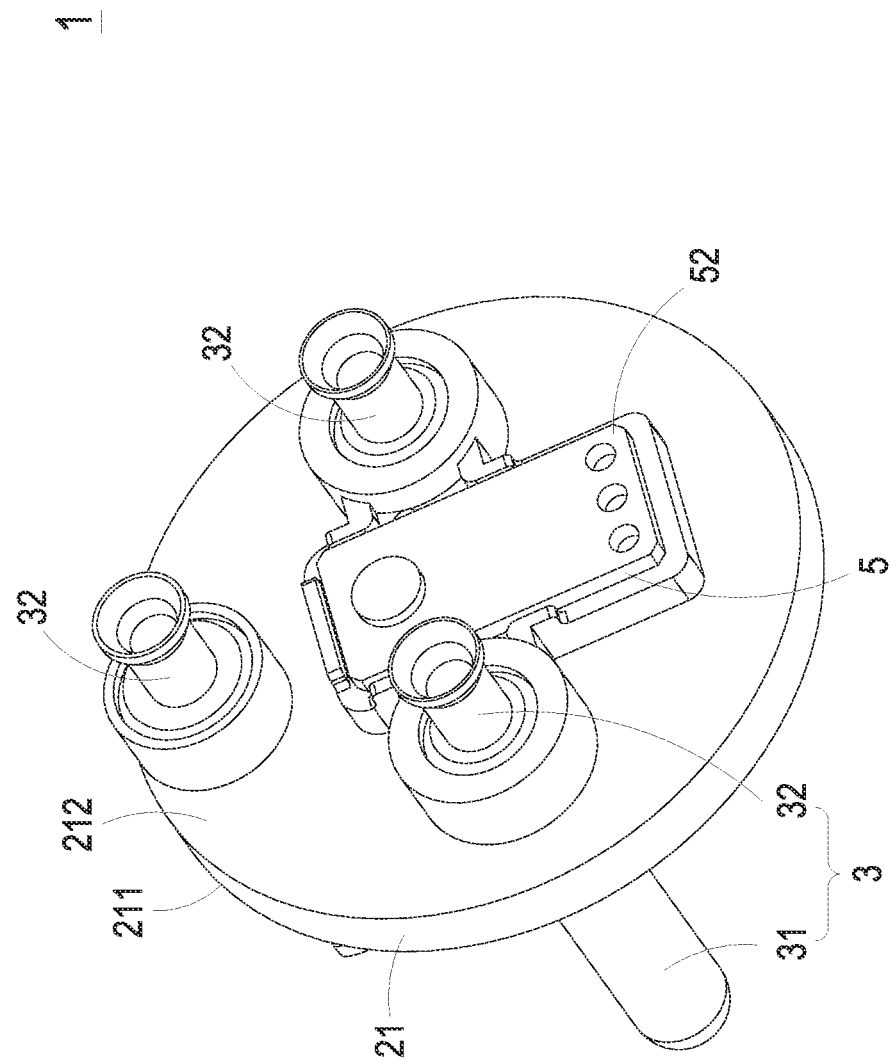
FIG. 2 is a schematic perspective view illustrating portion of the electrical plug as shown in FIG. 1 and taken along another viewpoint.
Figure 3:
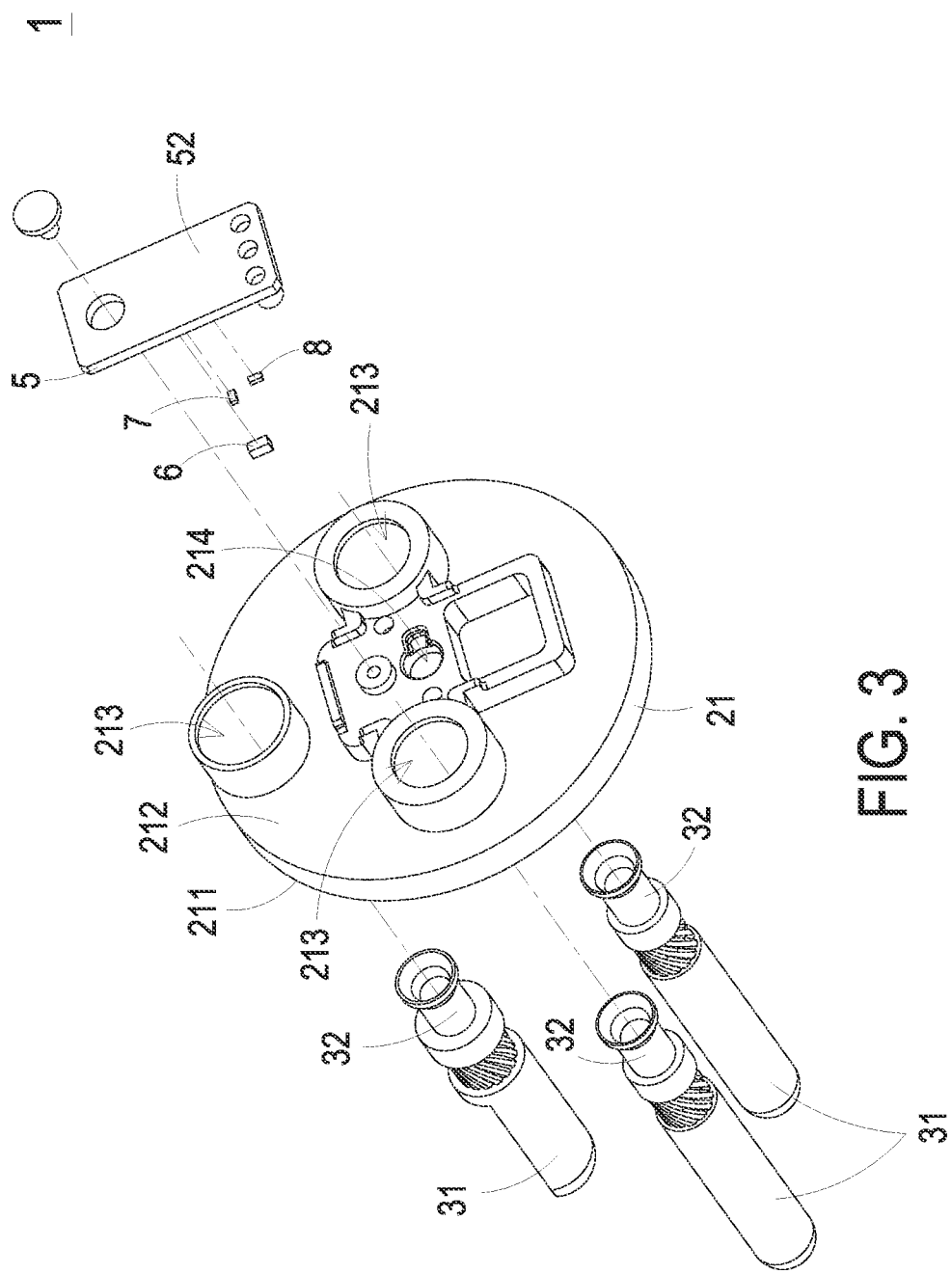
FIG. 3 is a schematic exploded view illustrating the portion of the electrical plug as shown in FIG. 2.
Figure 4:
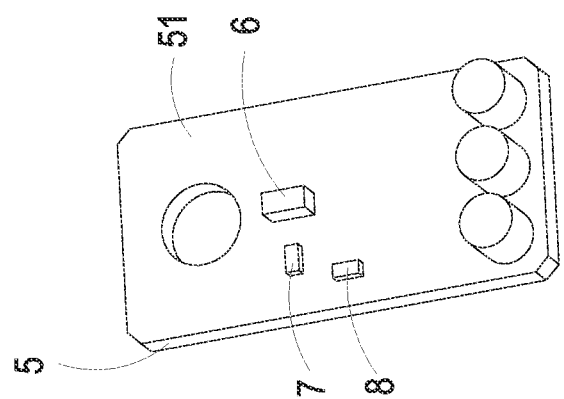
FIG. 4 is a schematic perspective view illustrating the arrangement of a first temperature detection element, a verification resistor, a second temperature detection element and a circuit board of the electrical plug as shown in FIG. 2.
Figure 5:
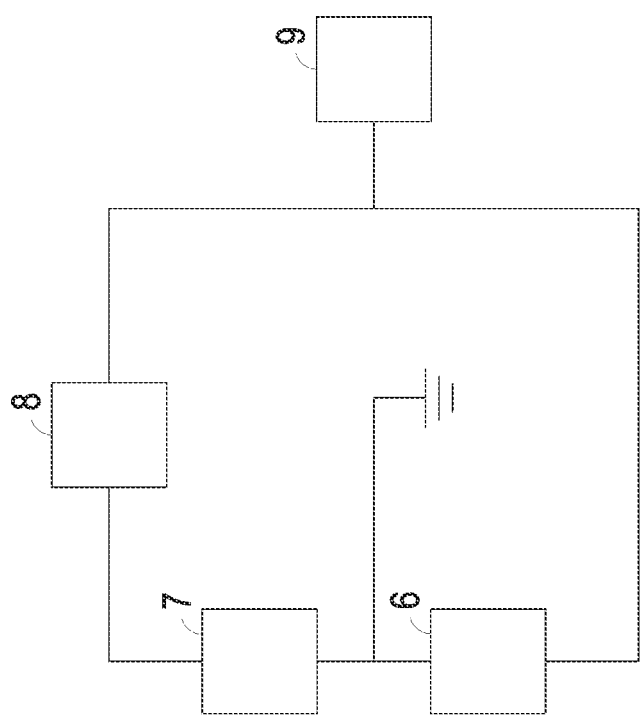
FIG. 5 is a circuit block diagram illustrating portion of the components of the electrical plug as shown in FIG. 2.

Please refer to FIGS. 1 to 5. FIG. 1 is a schematic perspective view illustrating the structure of an electrical plug according to a first embodiment of the present disclosure. FIG. 2 is a schematic perspective view illustrating portion of the electrical plug as shown in FIG. 1 and taken along another viewpoint. FIG. 3 is a schematic exploded view illustrating the portion of the electrical plug as shown in FIG. 2. FIG. 4 is a schematic perspective view illustrating the arrangement of a first temperature detection element, a verification resistor, a second temperature detection element and a circuit board of the electrical plug as shown in FIG. 2. FIG. 5 is a circuit block diagram illustrating portion of the components of the electrical plug as shown in FIG. 2. As shown in FIGS. 1 to 5, the electrical plug 1 of the present disclosure is applied to a charger for an electric vehicle (not shown) and is detachably coupled to a socket (not shown) of the electric vehicle (i.e., a load). When the electrical plug 1 is coupled to the socket, the electrical plug 1 provides an input power required by the socket and transmits the input power to the electric vehicle through the socket so that the charger charges the electric vehicle (not shown) with the input power. Generally, the electrical plug 1 has different types according to the sockets of different countries. The electrical plug 1 provides the input power required by the socket of the corresponding country to the electric vehicle. In the embodiment, the electrical plug 1 includes a casing 2, a plurality of contact pins 3, a power cable 4, a circuit board 5, a first temperature detection element 6, a verification resistor 7, a second temperature detection element 8 and a processor 9.

The casing 2 includes a setting board 21 and a cover portion 22. The setting board 21 includes a first surface 211, a second surface 212, a plurality of first holes 213 and a concave 214. The first surface 211 and the second surface 212 of the setting board 21 are opposite to each other. Each of the plurality of first holes 213 runs through the first surface 211 and the second surface 212 of the setting board 21. The concave 214 is concavely formed from the second surface 212 of the setting board 21. The concave 214 is disposed at the center of the second surface 212 of the setting board 21. The cover portion 22 covers the second surface 212 of the setting board 21. An accommodation space is formed between the cover portion 22 and the setting board 21.

Each of the plurality of contact pins 3 is penetrated through the corresponding first hole 213 and disposed on the setting board 21 of the casing 2. Each of the plurality of contact pins 3 includes a first portion 31 and a second portion 32. The first portion 31 of each of the plurality of contact pins 3 is disposed on the first surface 211 of the setting board 21. The second portion 32 of each of the plurality of contact pins 3 is disposed on the second surface 212 of the setting board 21 and located in the accommodation space of the casing 2. Each of the plurality of contact pins 3 is plugged into a corresponding aperture of the socket through the first portion 31 thereof when the electrical plug 1 is coupled to the socket, so as to provide required input power to the socket. In some embodiments, the plurality of contact pins 3 have different types according to the sockets of the different countries. For example, the setting location or the shape of the plurality of contact pins 3 are different according to the sockets of different countries. In this embodiment, the second portions 32 of the two contact pins 3 of the plurality of contact pins 3 are disposed at two opposite sides of the concave 214 of the setting board 21, respectively. For example, the live wire contact pin and the neutral wire contact pin of the plurality of contact pins 3 are disposed at the two opposite sides of the concave 214 of the setting board 21.

Portion of the power cable 4 is disposed in the accommodation space of the casing 2. First end of the power cable 4 is connected with the plurality of contact pins 3. Second end of the power cable 4 is connected with the charger for the electric vehicle. The power cable 4 is used to transmit the input power to the load (i.e., the electric vehicle) through the socket when the electrical plug 1 is coupled to the socket and the electrical plug 1 is in a normal state. The circuit board 5 is disposed in the accommodation space of the casing 2 and disposed on the second surface 212 of the setting board 21. The circuit board 5 is located between the two second portions 32 of the two contact pins 3 of the plurality of contact pins 3. The circuit board 5 has a first surface 51 and a second surface 52. The first surface 51 and the second surface 52 of the circuit board 5 are opposite to each other. The first surface 51 of the circuit board 5 is contacted with or faces to the second surface 212 of the setting board 21.

Preferably but not exclusively, the first temperature detection element 6 is a thermistor having a negative temperature coefficient. The first temperature detection element 6 is disposed on the first surface 51 of the circuit board 5 and disposed in the concave 214 of the setting board 21. The first temperature detection element 6 is adjacent to the plurality of contact pins 3. The first temperature detection element 6 is used to detect the temperature of the plurality of contact pins 3 and output a first detection signal. The temperature variation of the plurality of contact pins 3 causes an impedance variation of the first temperature detection element 6. That is, the temperature variation of the plurality of contact pins 3 is correlated with the impedance variation of the first temperature detection element 6. For example, the impedance of the first temperature detection element 6 decreases as the temperature of the plurality of contact pins 3 increases. In this embodiment, the first detection signal reflects the impedance variation of the first temperature detection element 6.

The verification resistor 7 is disposed on the first surface 51 of the circuit board 5 and disposed in the concave 214 of the setting board 21. The verification resistor 7 has a corresponding impedance value according to the type of the electrical plug 1. For example, the plurality of contact pins 3 of the electrical plug 1 have different shapes for plugging into the corresponding apertures of the socket of the corresponding country. The verification resistor 7 has a preset impedance value according to the shapes of the plurality of contact pins 3. Consequently, when the electrical plug 1 is coupled to the socket of the electric vehicle, the socket of the electric vehicle determines the type of electrical plug 1 according to the preset impedance value of the verification resistor 7 of the electrical plug 1, so that the electric vehicle determines the type of the input power provided by the electrical plug 1 according to the type of the electrical plug 1.

The second temperature detection element 8 is disposed on the first surface 51 of the circuit board 5 and disposed in the concave 214 of the setting board 21. The second temperature detection element 8 is adjacent to the plurality of contact pins 3. The second temperature detection element 8 is electrically connected with the verification resistor 7 through the wire (not shown) disposed in the circuit board 5, so that the second temperature detection element 8 and the verification resistor 7 are in the same circuit loop. The second temperature detection element 8 is used to detect the temperature of the plurality of contact pins 3 and output a second detection signal. The temperature variation of the plurality of contact pins 3 causes a current variation of the second temperature detection element 8. That is, the temperature variation of the plurality of contact pins 3 is correlated with the current variation of the second temperature detection element 8. In the embodiment, the second detection signal reflects the current variation of the second temperature detection element 8.

In some embodiments, the second temperature detection element 8 is a diode. According to the element characteristic of the diode, when the temperature of the plurality of contact pins 3 increases, the second temperature detection element 8 produces a leakage current, so that the second detection signal reflects the variation of leakage current of the second temperature detection element 8.

In an embodiment, the processor 9 is disposed in the charger for the electric vehicle, and the processor 9 is electrically connected with the first temperature detection element 6 and the second temperature detection element 8 through the connection device (not shown) of the charger and the wire of the circuit board 5, so that the processor 9 receives the first detection signal outputted by the first temperature detection element 6 and the second detection signal outputted by the second temperature detection element 8. Alternatively, the processor 9 is disposed in the electrical plug 1. In the embodiment, the processor 9 determines the impedance variation of the first temperature detection 6 according to the first detection signal, or the processor 9 determines the current variation of the second temperature detection element 8 according to the second detection signal, so that the processor 9 determines whether the temperature of the plurality of contact pins 3 is greater than or equal to a temperature threshold. When the processor 9 determines that the temperature of the plurality of contact pins 3 is greater than or equal to the temperature threshold, the electrical plug 1 is in an over-temperature state and the processor 9 disables the electrical plug 1 to transmit the input power to the electric vehicle. When the processor 9 determines that the temperature of the plurality of contact pins 3 is less than the temperature threshold, the electrical plug 1 is in the normal state and the processor 9 enable the electrical plug 1 to transmit the input power to the electric vehicle.

From the above descriptions, the electrical plug 1 of the present disclosure includes the first temperature detection element 6 and the second temperature detection element 8. When the processor 9 determines that the temperature of the plurality of contact pins 3 is greater than or equal to the temperature threshold according to the first detection signal outputted by the first temperature detection element 6 and the second detection signal outputted by the second temperature detection element 8, the processor 9 disables the electrical plug 1 to transmit the input power to the electric vehicle. Comparing with the conventional electrical plug with only single temperature detection element, the electrical plug 1 of the present disclosure has two over-temperature protection mechanisms including the first temperature detection element 6 and the second temperature detection element 8. When one of the first temperature detection element 6 and the second temperature detection element 8 fails, the electrical plug 1 is still able to determine whether the temperature of the electrical plug 1 is greater than or equal to the temperature threshold according to the other one of the first temperature detection element 6 and the second temperature detection element 8. Consequently, the electrical plug 1 of the present disclosure is not subjected to over-temperature and cause danger easily. In addition, the electrical plug 1 of the present disclosure is sufficient to meet the redundant design required for functional safety so as to avoid unexpected hazards caused by the failure of a single temperature detection element. Therefore, the stability of the electrical plug 1 of the present disclosure is enhanced. Moreover, the second temperature detection element 8 is electrically connected with the verification resistor 7, and the second temperature detection element 8 and the verification resistor 7 are in the same circuit loop. Consequently, the electrical plug 1 of the present disclosure needn't be provided with additional circuit to connect with the second temperature detection element 8, and the electrical plug 1 of the present disclosure achieves the redundant design of functional safety.

Figure 6:
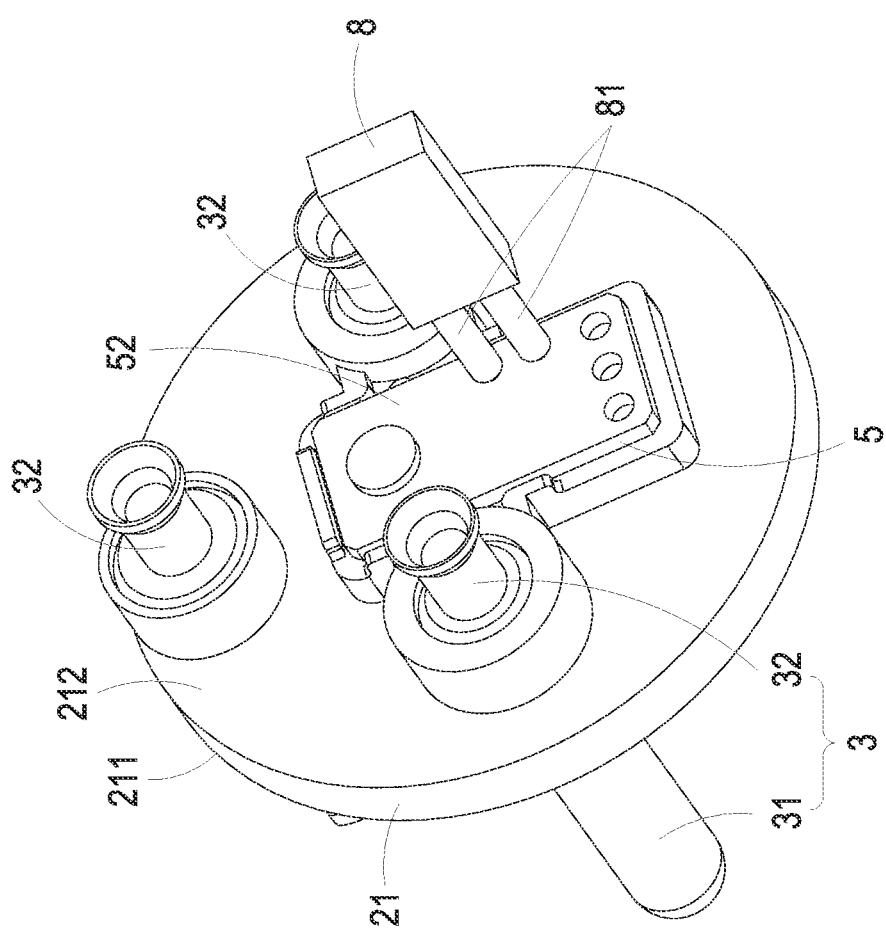
FIG. 6 is a schematic perspective view illustrating the structure of an electrical plug according to a second embodiment of the present disclosure.
Figure 7:
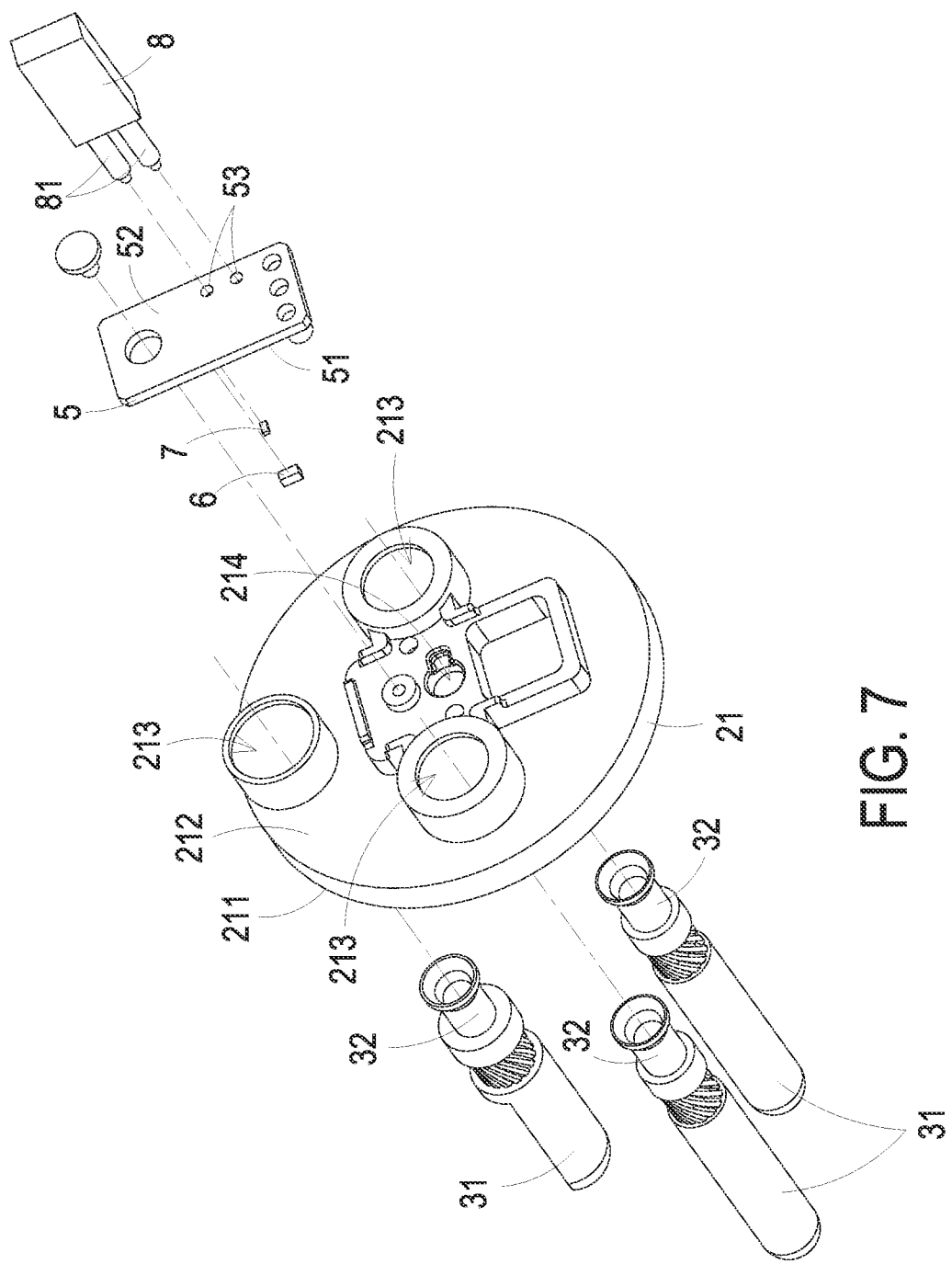
FIG. 7 is a schematic exploded view illustrating the structure of the electrical plug as shown in FIG. 6.
Figure 8:
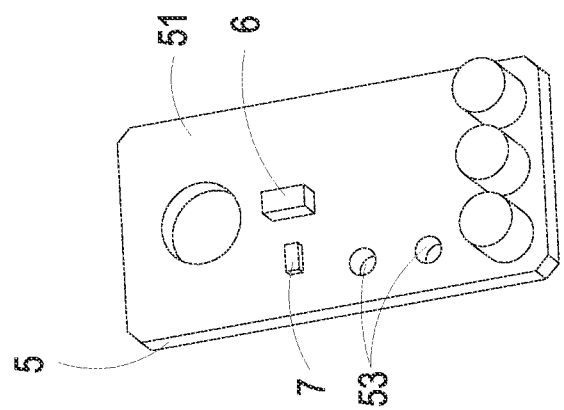
FIG. 8 is a schematic perspective view illustrating the arrangement of a first temperature detection element, a verification resistor, a second temperature detection element and a circuit board of the electrical plug as shown in FIG. 6.

Please refer to FIGS. 6 to 8. FIG. 6 is a schematic perspective view illustrating the structure of an electrical plug according to a second embodiment of the present disclosure. FIG. 7 is a schematic exploded view illustrating the structure of the electrical plug as shown in FIG. 6. FIG. 8 is a schematic perspective view illustrating the arrangement of a first temperature detection element, a verification resistor, a second temperature detection element and a circuit board of the electrical plug as shown in FIG. 6. In some embodiments, the second temperature detection element 8 is a fuse. The second temperature detection element 8 is turned on or cut off according to the temperature variation of the plurality of contact pins 3. For example, when the temperature of the plurality of contact pins 3 is greater than or equal to the temperature threshold, the second temperature detection element 8 (i.e., fuse) is in a cut off state so that the current of the second temperature detection element 8 is zero. Accordingly, the second detection signal reflects that the current of the second temperature detection element 8 is zero. The second temperature detection element 8 directly outputs the second detection signal according to the element status (i.e., the turn on state or the cut off state) of the second temperature detection element 8, so that the electrical plug 1 needn't be provided with additional element to detect the second temperature detection element 8. Consequently, the second temperature detection element 8 outputs the second detection signal in intuitiveness. In this embodiment, the second temperature detection element 8 includes a plurality of connection portions 81. As shown in FIG. 7, the second temperature detection element 8 includes two connection portions 81. Moreover, in the embodiment, the circuit board 5 includes a plurality of second holes 53. The number of the second holes 53 is corresponding to the number of the connection portions 81 of the second temperature detection element 8. In the embodiment, the circuit board 5 has two second holes 53. The two connection portions 81 of the second temperature detection element 8 are penetrated through the two second holes 53 correspondingly and respectively, so that the second temperature detection element 8 is disposed on the circuit board 5.

From the above descriptions, the electrical plug of the present disclosure includes the first temperature detection element and the second temperature detection element. When the processor determines that the temperature of the plurality of contact pins is greater than or equal to the temperature threshold according to the first detection signal outputted by the first temperature detection element and the second detection signal outputted by the second temperature detection element, the processor disables the electrical plug to transmit the input power to the load. Comparing with the conventional electrical plug with only single temperature detection element, the electrical plug of the present disclosure has two over-temperature protection mechanisms including the first temperature detection element and the second temperature detection element. When one of the first temperature detection element and the second temperature detection element fails, the electrical plug is still able to determine whether the temperature of the electrical plug is greater than or equal to the temperature threshold according to the other one of the first temperature detection element and the second temperature detection element. Consequently, the electrical plug of the present disclosure is not subjected to over-temperature and cause danger easily. In addition, the electrical plug of the present disclosure is sufficient to meet the redundant design required for functional safety so as to avoid unexpected hazards caused by the failure of a single temperature detection element. Therefore, the stability of the electrical plug of the present disclosure is enhanced. Moreover, the second temperature detection element is electrically connected with the verification resistor, and the second temperature detection element and the verification resistor are in the same circuit loop. Consequently, the electrical plug of the present disclosure needn't be provided with additional circuit to connect with the second temperature detection element, and the electrical plug of the present disclosure achieves the redundant design of functional safety. Furthermore, the second temperature detection element directly outputs the second detection signal according to the element status of the second temperature detection element, so that the electrical plug needn't be provided with additional element to detect the second temperature detection element. Consequently, the second temperature detection element outputs the second detection signal in intuitiveness.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical plug, detachably coupled to a socket of a load, the electrical plug comprising:
    a casing;
    a plurality of contact pins disposed on the casing and configured to plug into the socket so as to provide an input power required by the socket;
    a power cable connected with the plurality of contact pins and configured to transmit the input power to the load through the socket when the electrical plug is coupled to the socket and the electrical plug is in a normal state;
    a circuit board disposed in the casing;
    a first temperature detection element disposed on the circuit board and adjacent to the plurality of contact pins, wherein the first temperature detection element is configured to detect a temperature of the plurality of contact pins and output a first detection signal, wherein a temperature variation of the plurality of contact pins is correlated with an impedance variation of the first temperature detection element, and the first detection signal reflects the impedance variation of the first temperature detection element;
    a verification resistor disposed on the circuit board and having an impedance value according to a type of the electrical plug;
    a second temperature detection element disposed on the circuit board, adjacent to the plurality of contact pins and electrically connected with the verification resistor, wherein the second temperature detection element is configured to detect the temperature of the plurality of contact pins and output a second detection signal, wherein the temperature variation of the plurality of contact pins is correlated with a current variation of the second temperature detection element; and
    a processor electrically connected with the first temperature detection element and the second temperature detection element, wherein the processor is configured to determine whether the temperature of the plurality of contact pins is greater than or equal to a temperature threshold according to the first detection signal and the second detection signal, and the processor disables the electrical plug to transmit the input power to the load when the electrical plug is in an over-temperature state.

2. The electrical plug according to claim 1, wherein the casing comprises a setting board, the setting board comprises a first surface, a second surface, a plurality of first holes and a concave, the first surface and the second surface of the setting board are opposite to each other, each of the plurality of first holes runs through the first surface and the second surface of the setting board, each of the plurality of contact pins is penetrated through corresponding one of the plurality of first holes and disposed on the setting board, each of the plurality of contact pins comprises a first portion and a second portion, the first portion is disposed on the first surface of the setting board, the second portion is disposed on the second surface of the setting board, each of the plurality of contact pins is plugged into the socket through the first portion, the circuit board is disposed on the second surface of the setting board and disposed between two second portions of two contact pins of the plurality of contact pins, and the concave is concavely formed from the second surface of the setting board.

3. The electrical plug according to claim 2, wherein the second temperature detection element is a diode, the second temperature detection element is configured to produce a leakage current when the temperature of the plurality of contact pins increases so that the second detection signal reflects a variation of the leakage current of the second temperature detection element.

4. The electrical plug according to claim 3, wherein the circuit board has a first surface and a second surface, the first surface and the second surface of the circuit board are opposite to each other, and the first surface of the circuit board is contacted with or faces to the second surface of the setting board, wherein the first temperature detection element, the verification resistor and the second temperature detection element are disposed on the first surface of the circuit board and disposed in the concave of the setting board.

5. The electrical plug according to claim 2, wherein the second temperature detection element is a fuse, the second temperature detection element is turned on or cut off according to the temperature variation of the plurality of contact pins, wherein when the temperature of the plurality of contact pins is greater than or equal to the temperature threshold, the second temperature detection element is cut off so that a current of the second temperature detection element is zero, and the second detection signal reflects that the current of the second temperature detection element is zero.

6. The electrical plug according to claim 5, wherein the circuit board has a first surface, a second surface and a plurality of second holes, the first surface and the second surface of the circuit board are opposite to each other, and the first surface of the circuit board is contacted with or faces to the second surface of the setting board, wherein the first temperature detection element and the verification resistor are disposed on the first surface of the circuit board and disposed in the concave of the setting board, and the second temperature detection element includes a plurality of connection portions penetrated through the plurality of second holes so that the second temperature detection element is disposed on the circuit board.

7. The electrical plug according to claim 1, wherein the first temperature detection element is a thermistor having a negative temperature coefficient.

\* \* \* \* \*